United States Patent Office.

FREDERICK E. MATTHEWS, OF CHICAGO, ILLINOIS.

Letters Patent No. 114,172, dated April 25, 1871.

---

IMPROVEMENT IN COMPOSITIONS FOR PAVEMENTS.

---

The Schedule referred to in these Letters Patent and making part of the same.

---

I, FREDERICK E. MATTHEWS, of the city of Chicago, in the county of Cook and State of Illinois, have invented a certain new and useful Composition for Pavements and other purposes, of which the following is a full description.

The composition which I use is made as follows:

To each forty pounds of native Trinidad asphaltum I add one gallon of residuum of petroleum, and melt and thoroughly mix and heat them together until they become as fluid as possible, which will be at about the temperature of boiling water.

To one part (by measure) of this asphalt mixture I add from four to six parts (by measure) of broken or crushed stone or rock, or gravel, or both stone and gravel mixed, first heating the stone or gravel, or stone and gravel, to about the same temperature as the asphalt mixture, 212° Fahrenheit; then add one pound of bichromate of potash to about every five hundred pounds of said mixture of asphalt, residuum, and stone or gravel, and thoroughly mix the compound either by hand or machinery.

In making pavement the bed or foundation may be the ordinary soil or gravel or broken stone, made hard and smooth with a heavy roller; or it may be of stone, brick, or wood.

Upon such suitable foundation I spread the compound evenly while yet warm, and roll it down with a heavy roller until the whole is thoroughly compacted together.

When the compound or concrete is laid on a stone pavement the gravel or stone used in making the same should pass through a screen having an inch and a half mesh, and may be laid in one or two coats or layers, and may be from three to four inches thick.

When laid on an ordinary foundation the concrete should be laid in two layers or coats, and should be from six to eight inches thick when finished.

For the first layer the stone used in making the concrete may be such as would pass through a screen having a three-inch mesh; about six measures of the stone should be mixed with one measure of the asphalt mixture, and this layer should be about four inches thick.

For the second layer or coat the stone should pass through a screen having an inch and a half mesh, and be mixed with the asphalt mixture in the proportion of about four parts of the former to one part of the latter, and the second layer should be from two to three inches thick.

When the asphaltum is not good Trinidad asphalt the proportions above given of it and the residuum should be somewhat varied to make the mixture equivalent to the above specification, using less residuum.

Fine sand or any suitable fine hard substance may be sprinkled over the last coat just before or after rolling, to give the pavement a smooth compact surface.

The quantity of the asphalt mixture should be varied somewhat with the fineness of the other material used and the purpose for which the composition is to be used.

One object of the residuum of petroleum is to temper the concrete and prevent it from being too brittle.

When gravel or broken stone cannot be had any other suitable hard rough durable substance may be used, such as iron-ore or slag, sea-shells or hard-burned brick.

In cool weather it will be advisable to use hot rollers.

The composition can be used for pavements, walks, cellar-floors, roofs, and other similar purposes.

Walks, foot-paths, or floors can be used as soon as finished; pavements can be used as soon as cold, which will usually be within twenty-four hours after the same are completed.

The residuum of petroleum has proved to be far superior to coal-tar or similar substances heretofore used in similar compositions.

What I claim as new is as follows:

The composition herein described, consisting of Trinidad asphaltum, residuum of petroleum, broken or crushed stone, or gravel, or both stone and gravel, and bichromate of potash, combined and prepared substantially as and for the purposes specified.

FREDERICK E. MATTHEWS.

Witnesses:
E. A. WEST,
O. W. BOND.